(12) United States Patent
Abo et al.

(10) Patent No.: US 11,512,991 B2
(45) Date of Patent: Nov. 29, 2022

(54) FLOW METER AND METHOD OF MANUFACTURING FLOW METER

(71) Applicant: Surpass Industry Co., Ltd., Saitama (JP)

(72) Inventors: Kazuo Abo, Saitama (JP); Koji Nakajima, Saitama (JP)

(73) Assignee: SURPASS INDUSTRY CO., LTD., Saitama (JP)

(*) Notice: Subject to any disclaimer, the term of this patent is extended or adjusted under 35 U.S.C. 154(b) by 1 day.

(21) Appl. No.: 17/174,026

(22) Filed: Feb. 11, 2021

(65) Prior Publication Data

US 2021/0262843 A1    Aug. 26, 2021

(30) Foreign Application Priority Data

Feb. 20, 2020    (JP) .............................. JP2020-027194

(51) Int. Cl.
*G01F 1/69*    (2006.01)

(52) U.S. Cl.
CPC ...................................... *G01F 1/69* (2013.01)

(58) Field of Classification Search
CPC .......... G01F 1/69; G01F 1/692; G01F 1/6847; G01F 1/684; G01F 1/696
See application file for complete search history.

(56) References Cited

U.S. PATENT DOCUMENTS

| | | | | |
|---|---|---|---|---|
| 4,616,505 A | * | 10/1986 | Jouwsma | G01F 1/6847 |
| | | | | 73/204.26 |
| 5,259,243 A | * | 11/1993 | Drexel | G01F 5/00 |
| | | | | 73/204.25 |
| 2004/0237642 A1 | | 12/2004 | Masuichi et al. | |
| 2008/0264166 A1 | | 10/2008 | Wienand et al. | |
| 2016/0245682 A1 | | 8/2016 | Wienand et al. | |
| 2019/0035751 A1 | | 1/2019 | Ike | |

FOREIGN PATENT DOCUMENTS

| | | | | |
|---|---|---|---|---|
| DE | 3006584 A1 | 9/1981 | | |
| EP | 0131318 A1 | 1/1985 | | |
| EP | 2759811 A2 | 7/2014 | | |
| EP | 3059558 A1 | 8/2016 | | |
| JP | 2004108843 A | * | 4/2004 | ............. G01F 1/684 |
| JP | 2006-010322 A | | 1/2006 | |
| WO | WO-2016144717 A1 | * | 9/2016 | ............. G01F 1/684 |

OTHER PUBLICATIONS

Extended European Search Report for International Application No. 21157419.9, "Flow Meter and Method of Manufacturing Flow Meter," dated Jun. 30, 2021.

* cited by examiner

*Primary Examiner* — Francis C Gray
(74) *Attorney, Agent, or Firm* — Hamilton, Brook, Smith & Reynolds, P.C.

(57) ABSTRACT

Provided is a thermal flow meter including a conductive measurement tube including an inlet through which liquid enters and an outlet through which the liquid exits and including an internal flow passage extending along an axis, and a sensor substrate including a heating resistance wire and a temperature detecting resistance wire formed on a detection surface along the axis, and in the detection surface, an insulation area is formed where the heating resistance wire and the temperature detecting resistance wire are coated with a thin-film insulating material, and the insulation area is joined to the measurement tube along the axis.

7 Claims, 13 Drawing Sheets

FIG. 2
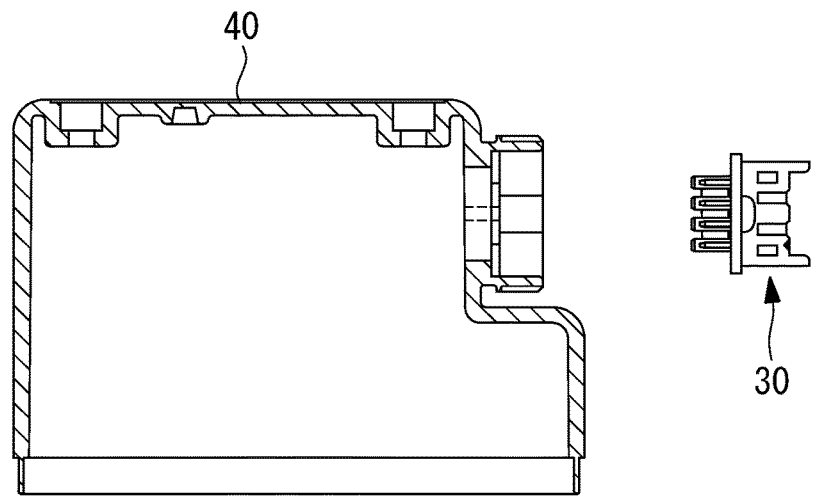
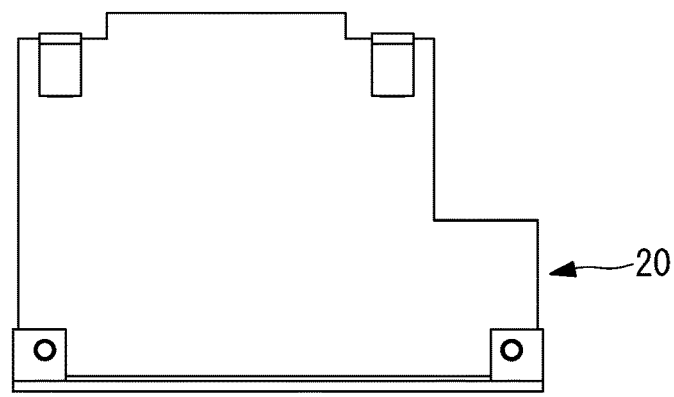
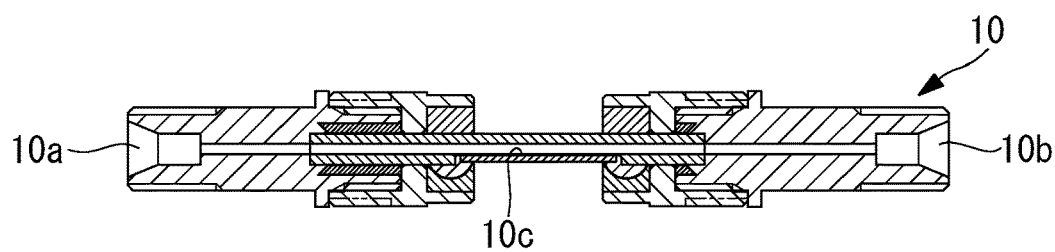
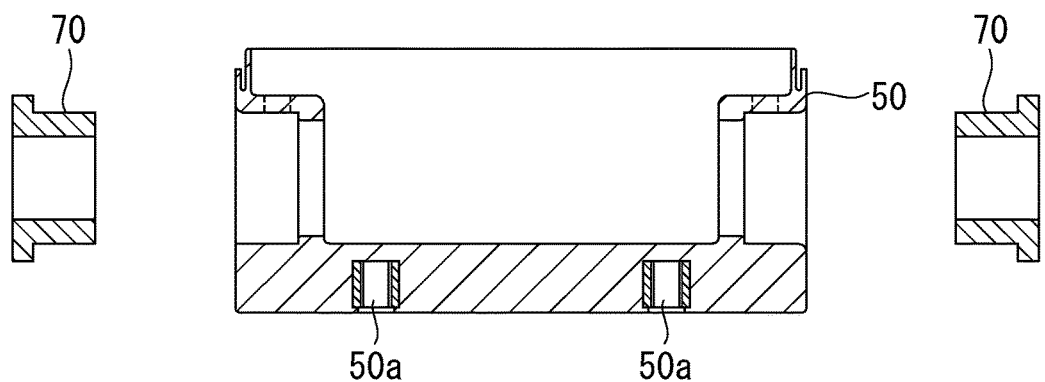

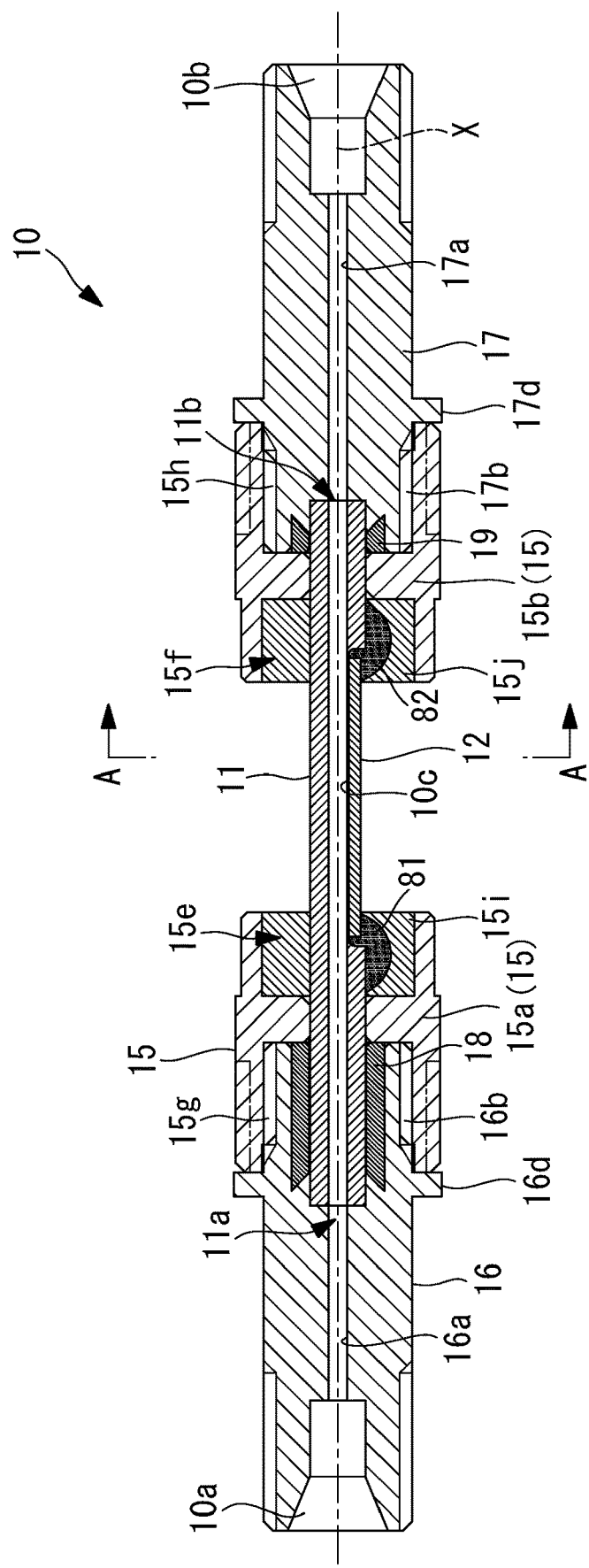

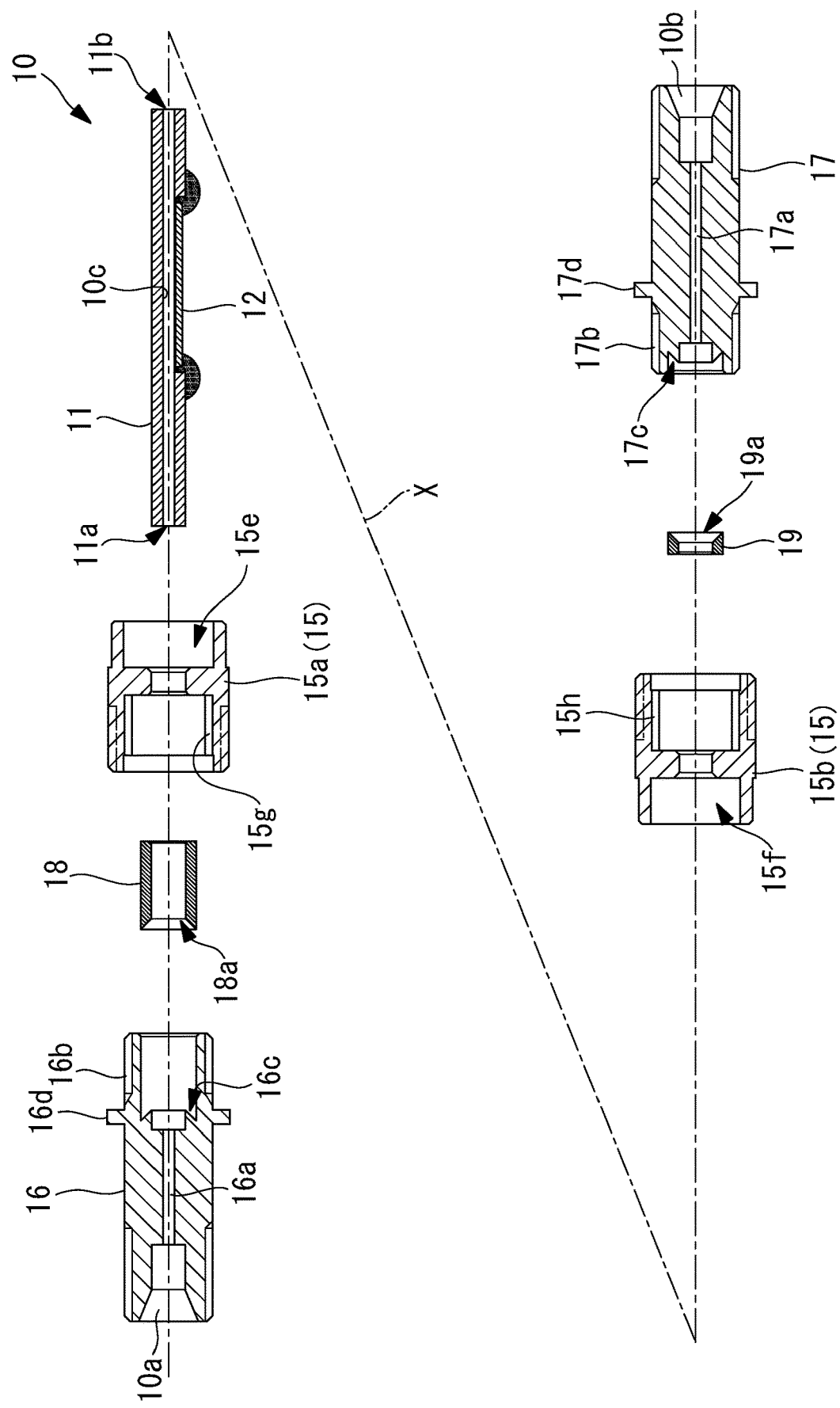

FLOW METER AND METHOD OF MANUFACTURING FLOW METER

RELATED APPLICATION

This application claims priority under 35 U.S.C. § 119 or 365 to Japanese, Application No. 2020-027194, filed Feb. 20, 2020. The entire teachings of the above application are incorporated herein by reference.

BACKGROUND

The present disclosure relates to a thermal flow meter and a method of manufacturing the same.

Thermal flow meters are known in the art that control the temperature of liquid flowing through the flow passage to measure a flow rate based on a difference between temperatures of the liquid upstream and downstream of the temperature control part (refer to Japanese Unexamined Patent Application, Publication No. 2006-10322, for example).

The Japanese Unexamined Patent Application, Publication No. 2006-10322 discloses a thermal flow meter with a flow passage a wetted portion of which is entirely formed of glass that is obtained by forming a rectangular groove on a glass substrate and bonding another glass substrate with a heat transfer means and a temperature detecting means to the groove side of the earlier glass substrate.

The thermal flow meter disclosed in Japanese Unexamined Patent Application, Publication No. 2006-10322 transfers heat from the heat transfer means through the glass substrate to liquid to be measured, and detects a temperature of the liquid to be measured by temperature detecting means arranged upstream and downstream of the heat transfer means to obtain a flow rate of the liquid to be measured.

The flow passage has a wetted portion that is entirely formed of glass, which is unfavorable in that it has poor corrosion resistance to alkaline liquids because silicon dioxide, the main component of glass, neutralizes with alkaline liquids. Accordingly, a tubular flow passage formed of a resin material with high corrosion resistance to alkaline liquids is preferably used for measuring a flow rate of an alkaline liquid.

However, the resin material has a lower thermal conductivity than glass, and hence liquid to be measured cannot be appropriately heated if a thickness of the flow passage formed of the resin material is set to be comparable to a thickness of a flow passage formed of glass. In this case, a difference between temperatures of subjects to be measured that are detected by the temperature detecting means decreases, and the flow rate of the subject to be measured might not be appropriately obtained.

The present disclosure has been made in view of the circumstances, and aims to provide a flow meter that can measure a flow rate by use of a temperature detecting substrate including a resistance element formed on a detection surface, while improving corrosion resistance to alkaline liquids, and also a method of manufacturing the flow meter.

SUMMARY

In order to solve the foregoing problem, the following solutions have been adopted in the present disclosure.

A flow meter according to an aspect of the present disclosure includes a conductive measurement tube including an inlet through which liquid enters and an outlet through which the liquid flowing from the inlet exits and including an internal flow passage extending along an axis, and a temperature detecting substrate including a heating resistance element and a temperature detecting resistance element formed on a detection surface along the axis, and in the detection surface, an insulation area is formed where the heating resistance element and the temperature detecting resistance element are coated with a thin-film insulating material, and the insulation area is joined to the measurement tube along the axis.

According to the flow meter of the aspect of the present disclosure, because the measurement tube including the internal flow passage through which the liquid flows is made of a metal, corrosion resistance to alkaline liquids can improve. Furthermore, in the detection surface of the temperature detecting substrate, the insulation area is formed where the heating resistance element and the temperature detecting resistance element are coated with the insulating material, and the insulation area is bonded with an adhesive to the measurement tube. For that reason, the conductive measurement tube and the heating resistance element and temperature detecting resistance element formed on the detection surface are electrically blocked by the thin-film insulating material. Therefore, a flow rate of the liquid flowing through the internal flow passage can be measured by using the temperature detecting substrate including the resistance elements formed on the detection surface.

A flow meter according to an aspect of the present disclosure preferably has a configuration where the detection surface is a flatly formed surface, an outer circumferential surface of the measurement tube has a flat surface disposed as opposed to the detection surface of the temperature detecting substrate, and the flat surface is bonded with the adhesive to the insulation area.

According to the flow meter with the present configuration, the flat surface formed on the outer circumferential surface of the measurement tube is bonded with an adhesive to the insulation area on the flatly formed detection surface. The flat surfaces are bonded to each other with the adhesive, and this can provide a broad contact area to enhance adhesiveness while reducing an amount of the adhesive required for the bonding.

In a flow meter according to an aspect of the present disclosure, a configuration is preferable where in the detection surface, a wiring pattern is formed to electrically connect the heating resistance element and the temperature detecting resistance element to an external connection terminal, and the insulation area is formed to expose a part of the wiring pattern.

According to the flow meter with the present configuration, the wiring pattern to electrically connect the heating resistance element and the temperature detecting resistance element to the external connection terminal is exposed from the insulation area, and hence the external connection terminal can be easily joined, after the insulation area is formed in the detection surface. Furthermore, operation check on the temperature detecting substrate can be performed, including a check using the wiring pattern as to whether or not resistance values of the heating resistance element and the temperature detecting resistance element are appropriate, before the external connection terminal is joined.

A thermal flow meter according to an aspect of the present disclosure preferably has a configuration where a first distance from the detection surface of the temperature detecting substrate to an inner circumferential surface of the internal flow passage is shorter than a second distance from a top of the measurement tube to the inner circumferential surface of the internal flow passage.

According to the flow meter with the present configuration, the first distance is shorter than the second distance, and this can improve a property of the heating resistance element to heat the liquid inside the internal flow passage and a property of the temperature detecting resistance element to detect a temperature of the liquid, as compared with a case where these distances are equal.

A flow meter according to an aspect of the present disclosure preferably has a configuration where the temperature detecting substrate is made of glass.

According to the flow meter with the present configuration, the temperature detecting substrate is used that is made of glass having less probability of deformation by heating, and this can suppress the deflection caused when the temperature detecting substrate is bonded to the measurement tube or during use.

A flow meter according to an aspect of the present disclosure preferably has a configuration where the measurement tube is formed of glassy carbon.

According to the flow meter with the present configuration, glassy carbon is a material having corrosion resistance to alkaline liquids, and hence the corrosion resistance to the alkaline liquids can improve. Furthermore, glassy carbon has a thermal conductivity lower than a thermal conductivity of a metal material, and has less amount of heat to be transferred in an axial direction of the measurement tube, and hence power required for heating the liquid flowing through the internal flow passage can be reduced.

A flow meter according to an aspect of the present disclosure preferably has a configuration where the flow meter includes a control substrate that outputs, to the temperature detecting substrate, a voltage signal to heat the heating resistance element, the control substrate outputs the voltage signal to the heating resistance element to periodically repeat a heating period to heat the heating resistance element and a non-heating period not to heat the heating resistance element, and the heating period is set to a period that is shorter than the non-heating period.

In the flow meter according to the aspect of the present disclosure, the heating period is set to the period that is shorter than the non-heating period, so that the non-heating period between two adjacent heating periods can be sufficiently acquired, and a difference between temperatures of liquid that are detected by the temperature detecting resistance element can be sufficiently acquired.

A method of manufacturing a flow meter according to an aspect of the present disclosure is a method of manufacturing a flow meter including a conductive measurement tube including an inlet through which liquid enters and an outlet through which the liquid flowing from the inlet exits and including an internal flow passage extending along an axis, and a temperature detecting substrate including a heating resistance element and a temperature detecting resistance element formed on a detection surface along the axis, the method including a resistance element forming step of forming the heating resistance element and the temperature detecting resistance element on the detection surface of the temperature detecting substrate, an insulation area forming step of coating the heating resistance element and the temperature detecting resistance element with a thin-film insulating material to form an insulation area in at least a part of the detection surface, and a joining step of joining the insulation area to the measurement tube along the axis.

In the method of manufacturing the flow meter according to the aspect of the present disclosure, the measurement tube including the internal flow passage, through which the liquid flows, is made of a metal, and hence the flow meter with improved corrosion resistance to alkaline liquids can be manufactured. Furthermore, the insulation area where the heating resistance element and the temperature detecting resistance element are coated with the insulating material is formed in at least a part of the detection surface of the temperature detecting substrate, and the insulation area is joined to the measurement tube. For that reason, the conductive measurement tube and the heating resistance element and temperature detecting resistance element formed on the detection surface are electrically blocked by the thin-film insulating material. Therefore, the flow meter can be manufactured that can measure a flow rate of the liquid flowing through the internal flow passage by use of the temperature detecting substrate including the resistance elements formed on the detection surface.

The present disclosure can provide a flow meter that can measure a flow rate by use of a temperature detecting substrate including a resistance element formed on a detection surface, while improving corrosion resistance to alkaline liquids, and also a method of manufacturing the flow meter.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

FIG. 2 is an exploded assembly view of the thermal flow meter shown in FIG. 1;

FIG. 3 is a vertical cross-sectional view of a sensor unit shown in FIG. 2;

FIG. 4 is an exploded assembly view of the sensor unit shown in FIG. 3;

DETAILED DESCRIPTION

A description of example embodiments follows.

The teachings of all patents, published applications and references cited herein are incorporated by reference in their entirety.

Hereinafter, a thermal flow meter 100 according to a first embodiment of the present disclosure will be described with reference to the drawings.

The thermal flow meter 100 of the embodiment heats liquid flowing through an internal flow passage and detects a temperature of the heated liquid to thereby measure a flow rate thereof. The thermal flow meter 100 of the embodiment is suitable for measuring a very small amount of flow rate in the range of from 0.1 cc/min to 30 cc/min, for example.

Figure 1:
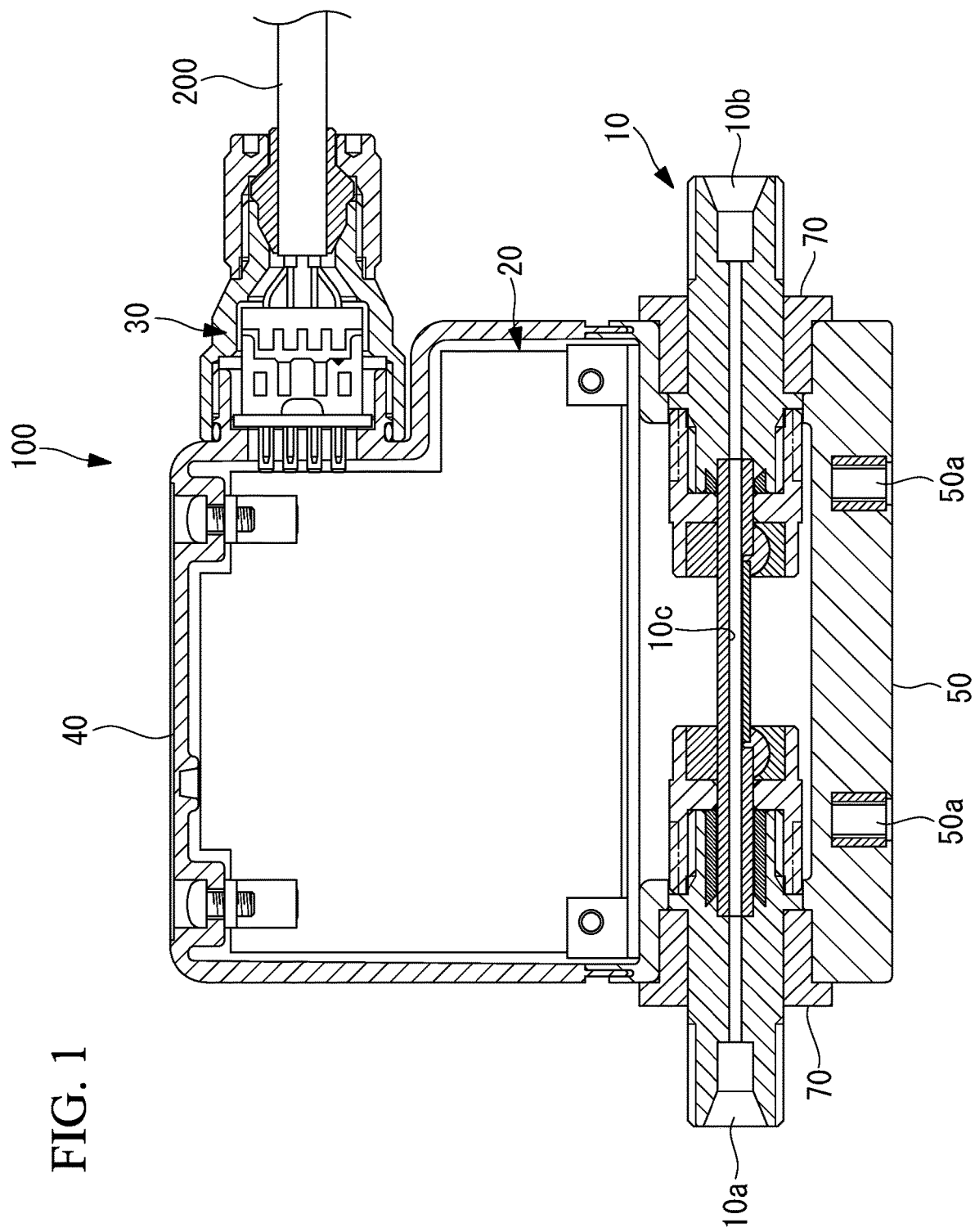
FIG. 1 is a vertical cross-sectional view of a thermal flow meter according to a first embodiment of the present disclosure.

As shown in FIGS. 1 and 2, the thermal flow meter 100 of the embodiment includes a sensor unit 10, a control substrate 20, a relay substrate 30, an upper case 40, and a bottom case 50.

As shown in FIG. 3, the sensor unit 10 lets incoming liquid from an inlet 10a connected to external piping (not shown) flow out through an outlet 10b connected to external piping (not shown), and at the same time, measures a flow rate of the liquid flowing through an internal flow passage 10c. The sensor unit 10 does not directly calculate the flow rate of the liquid, but detects the temperature of the liquid heated by a heating resistance wire 12a (a heating resistance element) that will be described later with temperature detecting resistance wires 12b, 12c, 12d, and 12e (temperature detecting resistance elements), and transmits a temperature detection signal indicating the detected temperature to the control substrate 20 through a signal wire (not shown). The sensor unit 10 will be described later in detail.

The control substrate 20 is a device that transmits a voltage signal to the heating resistance wire 12a of the sensor unit 10 to heat the heating resistance wire 12a, and also calculates a flow rate of the liquid based on temperatures transmitted from the temperature detecting resistance wires 12b, 12c, 12d, 12e. The control substrate 20 outputs the voltage signal to heat the heating resistance wire 12a, via a flexible substrate 60 (see FIG. 10) to a sensor substrate 12. Furthermore, the control substrate 20 outputs, via the flexible substrate 60 to the sensor substrate 12, a voltage signal to detect resistance values of the temperature detecting resistance wires 12b, 12c, 12d, 12e.

The control substrate 20 outputs the voltage signal to the heating resistance wire 12a to periodically repeat a heating period to heat the heating resistance wire 12a and a non-heating period not to heat the heating resistance wire 12a. The heating period is set to be shorter than the non-heating period. That is, the heating period is set to a rate of less than 0.5 of a cycle obtained by totaling the heating period and the non-heating period. A rate to a cycle of the heating period may be set to be less than 0.4.

The relay substrate 30 that relays various signals transmitted and received between the control substrate 20 and an external device (not shown). A cable 200 for transmitting and receiving the various signals to and from the external device (not shown) is connected to the relay substrate 30.

The upper case 40 serves as a housing for an upper portion of the thermal flow meter 100, and accommodates the control substrate 20 inside.

The bottom case 50 serves as a housing for a lower portion of the thermal flow meter 100, and accommodate the sensor unit 10 inside. With the sensor unit 10 inserted in the bottom case 50, a stopper 70 is inserted between the bottom case 50 and the sensor unit 10 from the inlet 10a side of the sensor unit 10.

Similarly, with the sensor unit 10 inserted in the bottom case 50, a stopper 70 is inserted between the bottom case 50 and the sensor unit 10 from the outlet 10b side of the sensor unit 10. The sensor unit 10 becomes fixed to the bottom case 50 by means of the stopper 70.

The bottom case 50 has fastening holes 50a on its bottom surface and is fixed to an installation surface (not shown) by fastening bolts (not shown) that are inserted from below the installation surface.

Next, the sensor unit 10 will be described in detail with reference to FIGS. 3 to 9.

As shown in FIGS. 3 and 4, the sensor unit 10 has a measurement tube 11, a sensor substrate 12 (temperature detecting substrate), a nut 15, an inlet-side body 16, an outlet-side body 17, an inlet-side ferrule 18, and an outlet-side ferrule 19.

Figure 6:
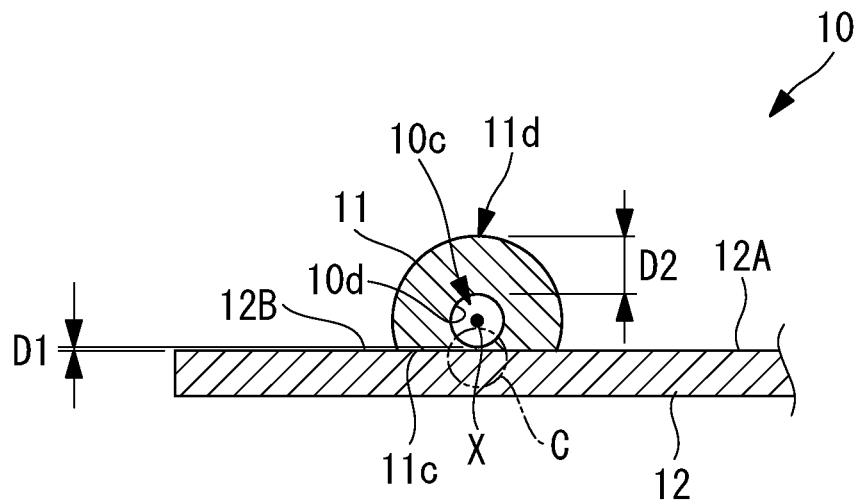
FIG. 6 is an end view of the sensor unit taken along the line A-A shown in FIG. 3.

The measurement tube 11 is a tube including an inlet 11a through which liquid enters and an outlet 11b through which the liquid flowing from the inlet 11a exits. As shown in FIG. 6 (a cross-sectional view taken along the line A-A in FIG. 3), the measurement tube 11 includes the internal flow passage 10c extending along an axis X and having a circular cross section. The measurement tube 11 is formed of a metal material having corrosion resistance to alkaline liquids (e.g., a stainless steel material such as SUS304 or 316, or nickel alloy such as Hastelloy®.

Furthermore, the measurement tube 11 may be a conductive tube element having the corrosion resistance to alkaline liquids and having conductivity. As this tube element, for example, a tube element made of glassy carbon may be used.

Figure 5A:
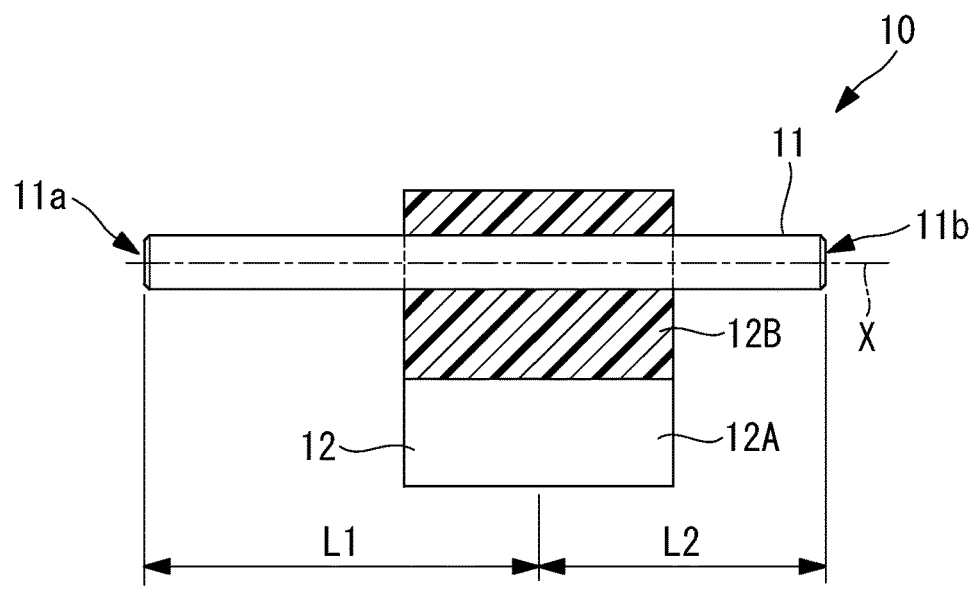
FIG. 5A is a plan view of a measurement tube and a sensor substrate shown in FIG. 3.
Figure 5B:
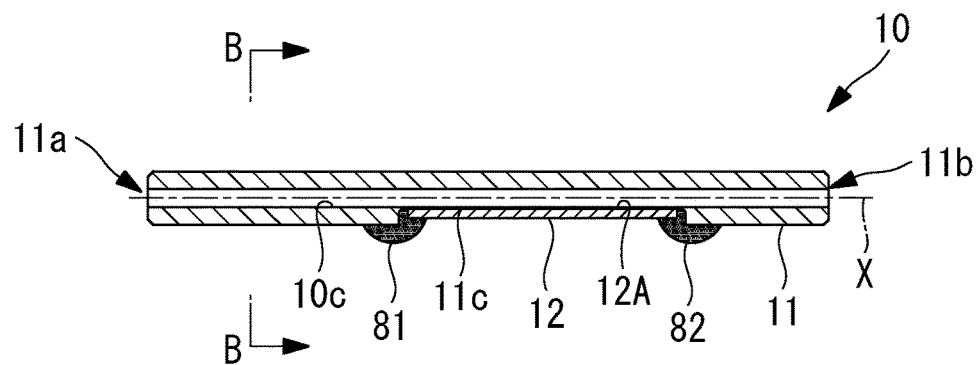
FIG. 5B is a vertical cross-sectional view of the measurement tube and the sensor substrate shown in FIG. 3.
Figure 9:
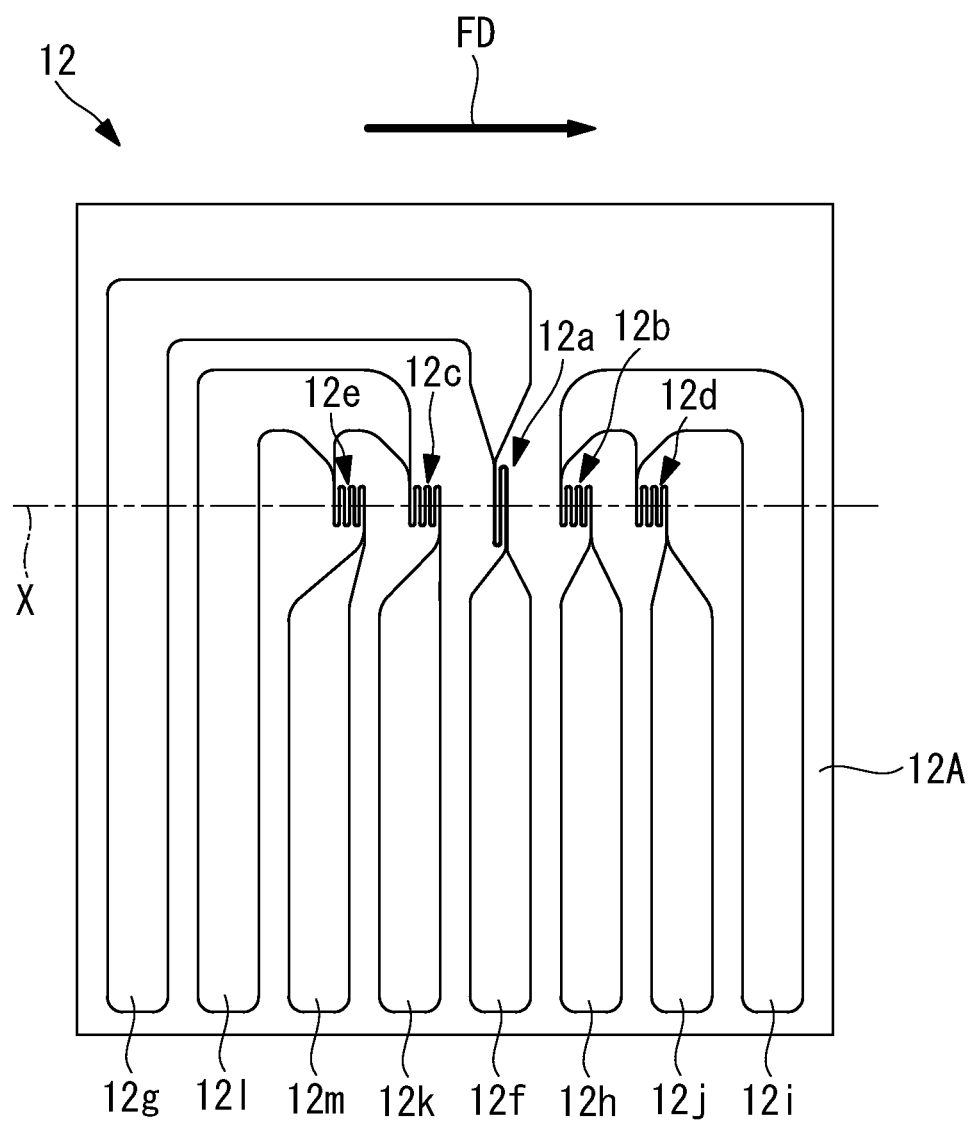
FIG. 9 is a plan view of the sensor substrate shown in FIG. 5B as seen from a detection surface side, and shows a state where an insulation area is omitted.
Figure 10:
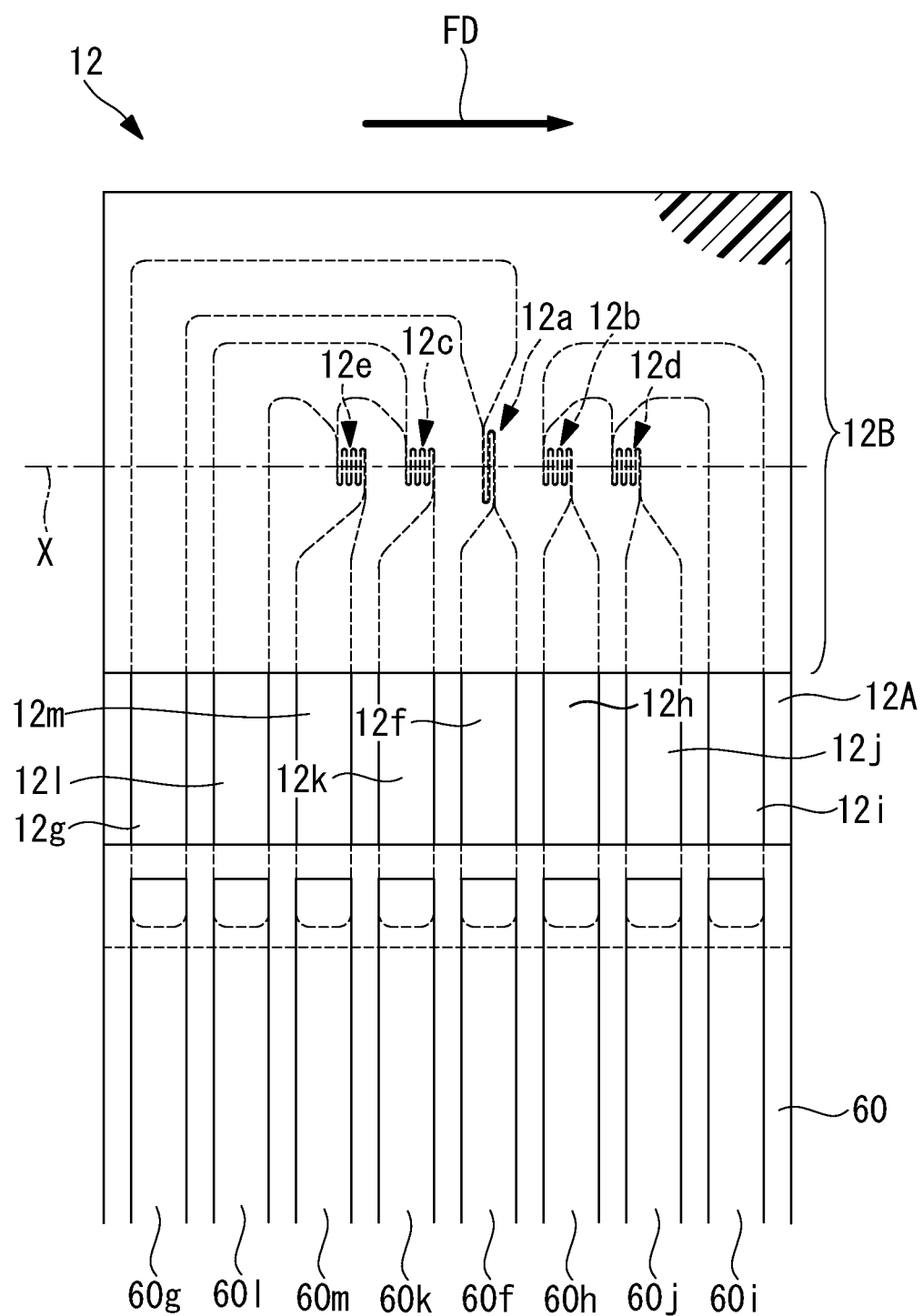
FIG. 10 is a plan view of the sensor substrate shown in FIG. 5B as seen from the detection surface side.

FIG. 9 is a plan view of the sensor substrate 12 shown in FIG. 5B seen from a detection surface 12A side, and shows a state where an insulation area 12B is omitted. FIG. 10 is a plan view of the sensor substrate 12 shown in FIG. 5B seen from a detection surface 12A side.

As shown in FIG. 9, the sensor substrate 12 is a substrate made of glass (e.g., made of quartz glass having a high silicon dioxide content) with the temperature detecting resistance wire (the temperature detecting resistance element) 12e, the temperature detecting resistance wire (the temperature detecting resistance element) 12c, the heating resistance wire (the heating resistance element) 12a, the temperature detecting resistance wire (the temperature detecting resistance element) 12b and the temperature detecting resistance wire (the temperature detecting resistance element) 12d formed on the detection surface 12A along the axis X.

The detection surface 12A is a flatly formed surface extending along the axis X. The heating resistance wire 12a, the temperature detecting resistance wire 12b, and the temperature detecting resistance wire 12c are each formed of a metal film, such as of platinum, evaporated onto the glass substrate.

The liquid flowing through the measurement tube 11 flows along the axis X in a flow direction FD from the left toward the right in FIGS. 9 and 10. Accordingly, when the heating resistance wire 12a is heated momentarily, the heated liquid flows along the axis X to a position of the temperature detecting resistance wire 12b and then to a position of the temperature detecting resistance wire 12d. The control substrate 20 detects electrical resistance values of the temperature detecting resistance wire 12b and the temperature detecting resistance wire 12d that change with temperature, to measure temperatures of the temperature detecting resistance wire 12b and the temperature detecting resistance wire 12d.

As shown in FIG. 3, a middle position of the sensor substrate 12 in a direction of an axis X is on an outlet 11b side of an intermediate position at an equal distance from both the inlet 11a and the outlet 11b of the measurement tube 11. Furthermore, as shown in FIG. 9 and FIG. 10, a position where the heating resistance wire 12a is disposed in the sensor substrate 12 is on the outlet 11b side of an intermediate position at an equal distance from both an inlet 11a side end portion of the sensor substrate 12 and an outlet 11b side end portion of the sensor substrate 12.

A distance from the inlet 11a of the measurement tube 11 to the heating resistance wire 12a on the axis X is longer than a distance from the outlet 11b of the measurement tube 11 to the heating resistance wire 12a on the axis X. Consequently, the distance from the inlet 11a of the measurement tube 11 to the heating resistance wire 12a can be increased, and turbulence or the like of the liquid flowing into the inlet 11a of the measurement tube 11 can be sufficiently reduced before the liquid is heated.

The control substrate 20 can calculate the flow speed of the liquid flowing in the measurement tube 11 from the timing at which the heating resistance wire 12a was momentarily heated and the timings at which the temperature detecting resistance wire 12b and the temperature detecting resistance wire 12d subsequently detect the temperature of the heated liquid. Also, the control substrate 20 can calculate the flow rate of the liquid from the obtained flow speed and the cross-sectional area of the measurement tube 11.

When the heating resistance wire 12a is momentarily heated, heat transferred from the heating resistance wire 12a to the detection surface 12A is transferred along the axis X in a direction reverse to the flow direction FD of the liquid, reaches a position of the temperature detecting resistance wire 12c, and then reaches a position of the temperature detecting resistance wire 12e. The control substrate 20 detects electrical resistance values of the temperature detecting resistance wire 12c and the temperature detecting resistance wire 12e that change with temperature, to measure temperatures of the temperature detecting resistance wire 12c and the temperature detecting resistance wire 12e.

The control substrate 20 subtracts the temperature of the temperature detecting resistance wire 12c from the temperature of the temperature detecting resistance wire 12b. The temperature detected by the temperature detecting resistance wire 12c upstream of the heating resistance wire 12a in the flow direction FD corresponds to heat that is transferred by the heating resistance wire 12a to the measurement tube 11 and is not transferred to the liquid but is transferred via the measurement tube 11 to the temperature detecting resistance wire 12c. The temperature detecting resistance wire 12b and the temperature detecting resistance wire 12c are arranged at an equal distance to the heating resistance wire 12a.

For that reason, the temperature of the temperature detecting resistance wire 12c is subtracted from the temperature of the temperature detecting resistance wire 12b, so that a temperature of liquid passing the position of the temperature detecting resistance wire 12b can be measured. Similarly, the control substrate 20 can subtract the temperature of the temperature detecting resistance wire 12e from the temperature of the temperature detecting resistance wire 12d, to measure a temperature of liquid passing the position of the temperature detecting resistance wire 12d.

As shown in FIG. 9 and FIG. 10, in the detection surface 12A, a wiring pattern 12f connected to one end of the heating resistance wire 12a and a wiring pattern 12g connected to the other end of the heating resistance wire 12a are formed. Also, in the detection surface 12A, a wiring pattern 12h connected to one end of the temperature detecting resistance wire 12b, a wiring pattern 12i connected to the other end of the temperature detecting resistance wire 12b and a wiring pattern 12j connected to one end of the temperature detecting resistance wire 12d are formed. The other end of the temperature detecting resistance wire 12d is connected to the wiring pattern 12i.

Also, in the detection surface 12A, a wiring pattern 12k connected to one end of the temperature detecting resistance wire 12c, a wiring pattern 12l connected to the other end of the temperature detecting resistance wire 12c and a wiring pattern 12m connected to one end of the temperature detecting resistance wire 12e are formed. The other end of the temperature detecting resistance wire 12e is connected to the wiring pattern 12l. The wiring patterns 12f, 12g, 12h, 12i, 12j, 12k, 12l, 12m are each formed of a metal film, such as of platinum, evaporated onto the glass substrate.

As shown in FIG. 10, end portions of the wiring patterns 12f, 12g, 12h, 12i, 12j, 12k, 12l, 12m are joined to metal wiring patterns 60f, 60g, 60h, 60i, 60j, 60k, 60l, 60m arranged in the flexible substrate (the external connection terminal) 60 formed of film resin, respectively. Each of the wiring patterns 60f, 60g, 60h, 60i, 60j, 60k, 60l, 60m of the flexible substrate 60 is electrically connected to the control substrate 20.

As shown in FIG. 10, in the detection surface 12A, the insulation area (an insulation layer) 12B is formed where the heating resistance wire 12a and the temperature detecting resistance wires 12b, 12c, 12d, 12e are coated with a thin-film insulating material. The insulation area 12B is formed by evaporating, for example, zirconia ($ZrO_2$), alumina ($Al_2O_3$), silica ($SiO_2$), or a nitride film (SiN, SiON or the like). Alternatively, as the insulation area 12B, a resin film may be joined to the detection surface 12A. Alternatively, as the insulation area 12B, insulating paint may be applied.

Figure 8:
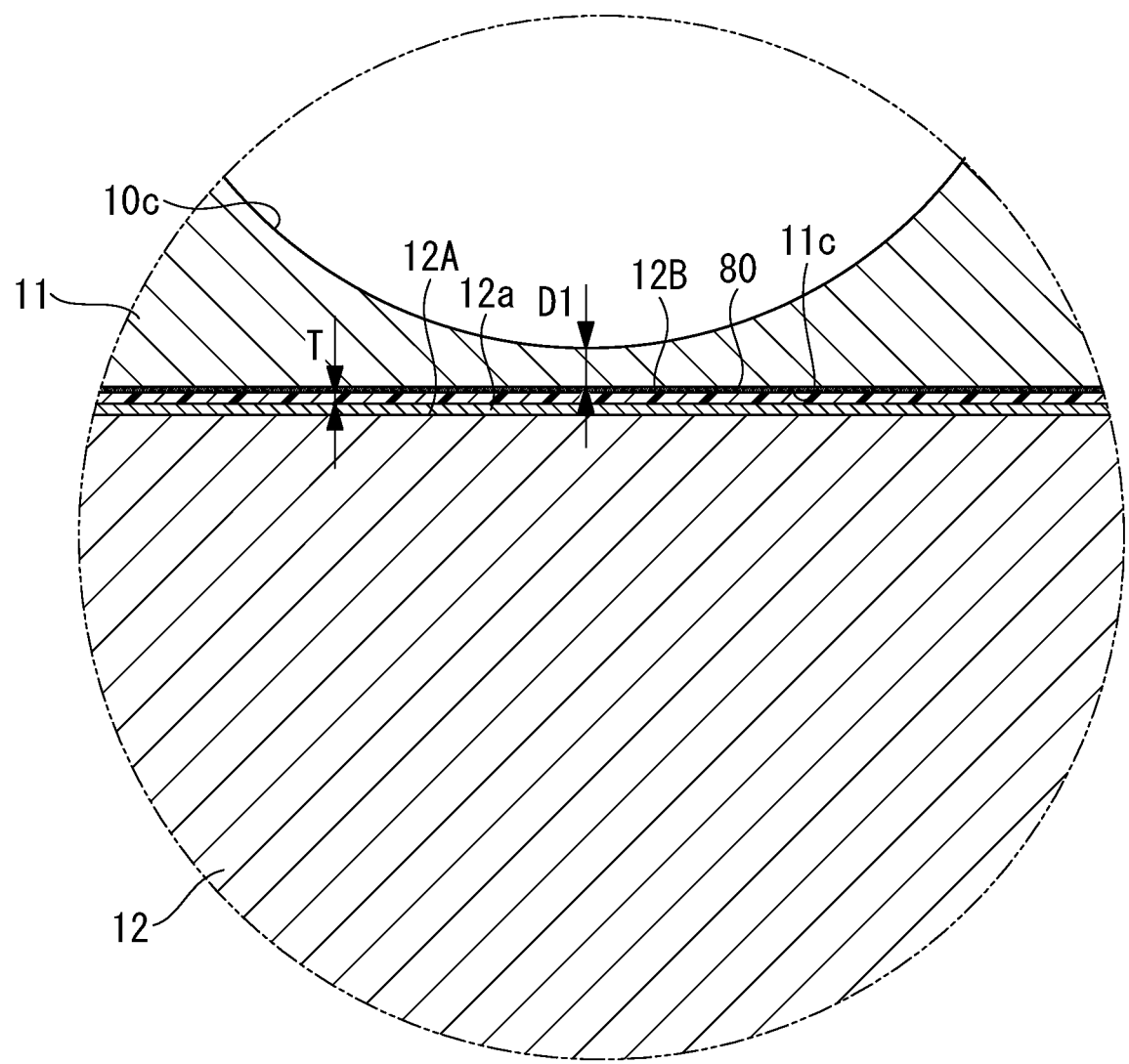
FIG. 8 is a partially enlarged view of a part C of the measurement tube and the sensor substrate shown in FIG. 6.

As shown in FIG. 8, the insulation area 12B is formed as the insulation layer having a constant thickness T in contact with a portion above the heating resistance wire 12a to coat the heating resistance wire 12a formed in the detection surface 12A of the sensor substrate 12. The insulation area 12B is bonded to a flat surface 11c of the measurement tube 11 via an adhesive layer formed of an adhesive 80. FIG. 8 shows an example where the insulation area 12B is formed above the heating resistance wire 12a, and the insulation area 12B is also formed above the temperature detecting resistance wires 12b, 12c, 12d, 12e. The insulation area 12B is formed with the thickness T in a range of, for example, 0.1 μm or more and 10 μm or less.

Examples of the adhesive 80 may include epoxy resin-based adhesives, UV curable resin-based adhesives, thermo-setting-resin-based adhesives, and low melting point glasses. The adhesive 80 is an insulating material having insulation, and therefore has a function of interfering with continuity of the measurement tube 11 formed of the metal material to the heating resistance wire 12a and the temperature detecting resistance wires 12b, 12c, 12d, 12e.

However, only with the adhesive 80, a thickness of the adhesive layer (the insulation layer) formed at each position is not constant due to, for example, a pressure applied between the sensor substrate 12 and the measurement tube 11 during joining, and the adhesive layer might not be formed depending on a location. Therefore, the function of interfering with the continuity of the measurement tube 11 to the heating resistance wire 12a and the temperature detecting resistance wires 12b, 12c, 12d, 12e is borne mainly by the insulation area 12B, and the adhesive 80 further improves the insulation provided by the insulation area 12B.

Figure 7:
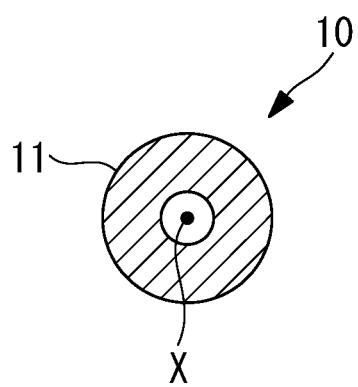
FIG. 7 is an end view of the measurement tube and the sensor substrate taken along the line B-B shown in FIG. 5B.

As shown in FIG. 6 (the cross-sectional view taken along the line A-A in FIG. 3), the measurement tube 11 has an almost circular upper side of a cross section defined by a plane orthogonal to the axis X at a position to which the sensor substrate 12 is bonded. A part of an outer circumferential surface of the measurement tube 11 that is disposed as opposed to the detection surface 12A of the sensor substrate 12 is the flat surface 11c that is flat. On the other hand, as shown in FIG. 7 (a cross-sectional view taken along the line B-B of FIG. 5B), the measurement tube 11 has a circular cross section defined by the plane orthogonal to the axis X at a position of the tube to which the sensor substrate 12 is not bonded.

As shown in FIG. 5A, FIG. 5B, and FIG. 6, the flat surface 11c of the measurement tube 11 is disposed as opposed to the detection surface 12A of the sensor substrate 12. The insulation area 12B is bonded with the adhesive 80 (see FIG. 8) to the flat surface 11c of the measurement tube 11 along the axis X. The insulation area 12B is formed to expose a part of the wiring pattern 60f, 60g, 60h, 60i, 60j, 60k, 60l or 60m.

Figure 5C:
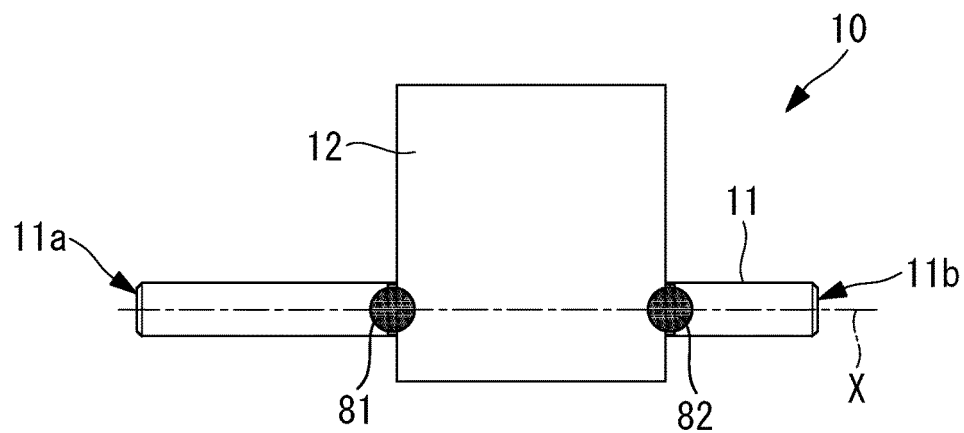
FIG. 5C is a bottom view of the measurement tube and the sensor substrate shown in FIG. 3.

As shown in FIG. 5B and FIG. 5C, the inlet 11a side end portion of the sensor substrate 12 and an inlet 11a side end portion of the flat surface 11c are joined with an adhesive 81, and the outlet 11b side end portion of the sensor substrate 12 and an outlet 11b side end portion of the flat surface 11c are joined with an adhesive 82. As the adhesive 81 and the adhesive 82, for example, an epoxy resin-based adhesive may be used.

The inlet 11a side end portion of the flat surface 11c and the outlet 11b side end portion of the flat surface 11c are locations where an outer diameter of the measurement tube 11 changes, and are therefore regions on which stress acting on the measurement tube 11 is concentrated and which might be cracked. The inlet 11a side end portion of the flat surface 11c is reinforced with the adhesive 81 and hence the measurement tube 11 can be prevented from being cracked. Similarly, the outlet 11b side end portion of the flat surface 11c is reinforced with the adhesive 82 and hence the measurement tube 11 can be prevented from being cracked.

As shown in FIG. 6, a distance D1 (a first distance) from the detection surface 12A of the sensor substrate 12 to an inner circumferential surface 10d of the internal flow passage 10c is shorter than a distance D2 (a second distance) from a top 11d of the measurement tube 11 to the inner circumferential surface 10d of the internal flow passage 10c. Thus, the distance D1 from the detection surface 12A of the sensor substrate 12 to the inner circumferential surface 10d of the internal flow passage 10c is shorter than the distance D2, to improve thermal conductivity from the heating resistance wire 12a to the liquid and to improve properties of the temperature detecting resistance wire 12b and the temperature detecting resistance wire 12d to detect the temperatures. The distance D1 is preferably 0.2 mm or less, and is, for example, 0.1 mm.

The inlet-side body 16 receives the inlet 11a of the measurement tube 11 and has inside a connection flow passage 16a (a first connection flow passage) that has a circular cross section, as shown in FIG. 3. The inlet-side body 16 has external threads 16b on an outer circumferential surface of its end portion facing the outlet 10b.

The outlet-side body 17 receives the outlet 11b of the measurement tube 11 and has inside a connection flow passage 17a (a second connection flow passage) that has a circular cross section, as shown in FIG. 3. The outlet-side body 17 has external threads 17b on an outer circumferential surface of its end portion facing the inlet 10a. The inlet-side body 16 and the outlet-side body 17 are formed from a resin material with high corrosion resistance (e.g., PTFE: polytetrafluoroethylene).

The nuts 15 include the inlet-side nut 15a attached to the inlet-side body 16 and the outlet-side nut 15b attached to the outlet-side body 17. As shown in FIG. 3, the inlet-side nut 15a is a cylindrical member fitted along the outer circumferential surface of the measurement tube 11 to be closer to the outlet 11b than the inlet-side body 16.

The inlet-side nut 15a has internal threads 15g on an inner circumferential surface of its end portion facing the inlet 10a. Also, the outlet-side nut 15b is a cylindrical member fitted along the outer circumferential surface of the measurement tube 11 to be closer to the inlet 11a than the outlet-side body 17. The outlet-side nut 15b has internal threads 15h on an inner circumferential surface of its end portion facing the outlet 10b.

The inlet-side nut 15a is attached to the inlet-side body 16 as the internal threads 15g of the inlet-side nut 15a and the external threads 16b of the inlet-side body 16 are fastened together. Similarly, the outlet-side nut 15b is attached to the outlet-side body 17 as the internal threads 15h of the outlet-side nut 15b and the external threads 17b of the outlet-side body 17 are fastened together.

The inlet-side nut 15a has a recess 15e (a first recess) that is recessed toward the inlet 10a, in its end portion facing the outlet 10b. As shown in FIG. 3, the inlet 11a side end portion of the sensor substrate 12 including the adhesive 81 is inserted into the recess 15e. Also, the recess 15e is filled with a filler 15i. The inlet 11a side end portion of the sensor substrate 12 is fixed to the inlet-side nut 15a by the filler 15i.

The outlet-side nut 15b has a recess 15f (a second recess) that is recessed toward the outlet 10b, in its end portion facing the inlet 10a. As shown in FIG. 3, the outlet 11b side end portion of the sensor substrate 12 including the adhesive 82 is inserted into the recess 15f. Also, the recess 15f is filled with a filler 15j. The outlet 11b side end portion of the sensor substrate 12 is fixed to the outlet-side nut 15b by the filler 15j.

Figure 11:
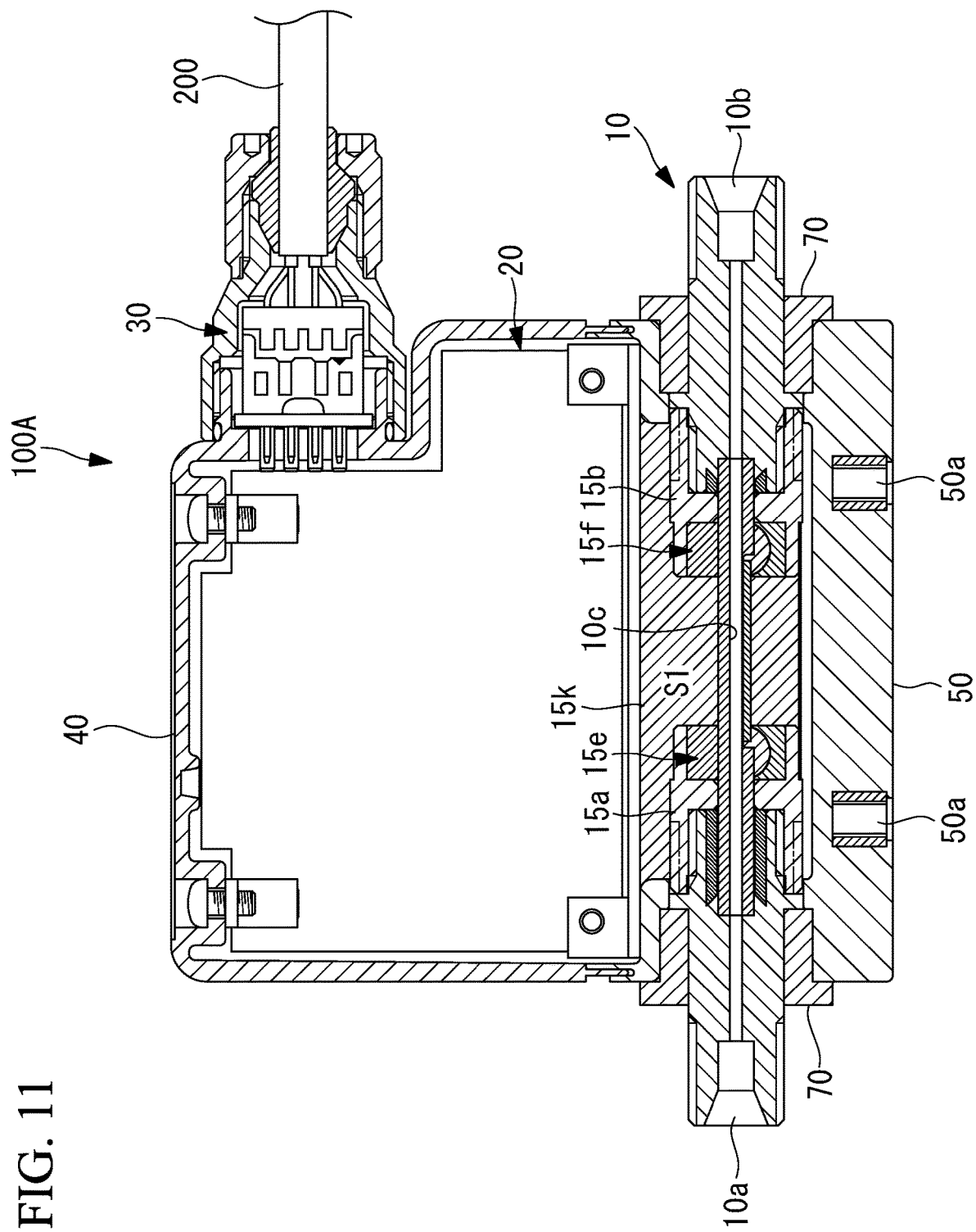
FIG. 11 is a vertical cross-sectional view of a thermal flow meter according to a modification.

It is to be noted that although the fillers are only charged into the recess 15e and recess 15f of the nuts 15 in the foregoing description, the sensor unit may have other configurations. For example, a filler 15k may be charged to fill up an entire internal space S1 of the bottom case 50 that includes the recess 15e and the recess 15f as in a thermal flow meter 100A according to a modification shown in FIG. 11. In that case, the sensor substrate 12 is entirely fixed with the filler 15k, and at the same time, the inlet-side nut 15a and the outlet-side nut 15b are fixed together by the filler 15k.

As shown in FIG. 3, the inlet-side ferrule 18 is a cylindrical resin member (e.g., formed of PTFE) that is inserted in between the outer circumferential surface of the measurement tube 11 and the inner circumferential surface of the outlet 10b side end portion of the inlet-side body 16. As shown in FIG. 4, an inlet 10a side end portion of the inlet-side ferrule 18 has a tip portion 18a at which the distance between an inner circumferential surface and an outer circumferential surface of the tip portion 18a gradually decreases toward the inlet 10a. The tip portion 18a is inserted into a groove portion 16c formed inside the inlet-side body 16 as it is inserted into the inlet-side body 16.

The outlet-side ferrule 19 is a cylindrical resin member (e.g., formed of PTFE) that is inserted in between the outer circumferential surface of the measurement tube 11 and an inner circumferential surface of the inlet 10a side end portion of the outlet-side body 17. As shown in FIG. 4, an outlet 10b side end portion of the outlet-side ferrule 19 has a tip portion 19a at which the distance between an inner circumferential surface and an outer circumferential surface gradually decreases toward the outlet 10b. The tip portion 19a is inserted into a groove portion 17c formed inside the outlet-side body 17 as it is inserted into the outlet-side body 17.

As shown in FIG. 4, the groove portion 16c of the inlet-side body 16 and the groove portion 17c of the outlet-side body 17 are each formed to decrease in the groove width with the distance from the entrance of the groove to the bottom portion. The groove portion 16c and the tip portion 18a have the same length in the direction of the axis X, while the groove portion 16c is sharper than the tip portion 18a. Thus, in order to accommodate the tip portion 18a in the groove portion 16c without leaving any space, the tip portion 18a needs to be deformed to conform to the shape of the groove portion 16c.

Similarly, the groove portion 17c and the tip portion 19a have the same length in the direction of the axis X, while the groove portion 17c is sharper than the tip portion 19a. Thus, in order to accommodate the tip portion 19a in the groove portion 17c without leaving any space, the tip portion 19a needs to be deformed to conform to the shape of the groove portion 17c.

The sensor unit 10 in the thermal flow meter 100 of the embodiment is assembled by fastening the internal threads 15g of the inlet-side nut 15a to the external threads 16b of the inlet-side body 16 with the inlet 11a of the measurement tube 11 and the inlet-side ferrule 18 inserted in the outlet 10b side end portion of the inlet-side body 16, and fastening the internal threads 15h of the outlet-side nut 15b to the external threads 17b of the outlet-side body 17 with the outlet 11b of the measurement tube 11 and the outlet-side ferrule 19 inserted in the inlet 10a side end portion of the outlet-side body 17.

The tip portion 18a of the inlet-side ferrule 18 is forced into the groove portion 16c of the inlet-side body 16 as the internal threads 15g of the inlet-side nut 15a become fastened to the external threads 16b of the inlet-side body 16. Because the groove portion 16c is sharper than the tip portion 18a, the tip portion 18a is gradually deformed as it is forced into the groove portion 16c, and finally, deformed to be accommodated in the groove portion 16c without leaving any space.

The deformation of the tip portion 18a forms a seal area between the outer circumferential surface of the measurement tube 11 and the inner circumferential surface of the inlet-side body 16, which reliably shuts off liquid that flows out through a location of connection of the connection flow passage 16a with the internal flow passage 10c so that the liquid never leaks to the outside. Moreover, the tip portion 18a of the inlet-side ferrule 18 is positioned in the vicinity of the location of connection of the connection flow passage 16a with the internal flow passage 10c, thereby reducing an amount of liquid that flows out through the connection location to be remained (dead volume).

The fastening of the internal threads 15g of the inlet-side nut 15a and the external threads 16b of the inlet-side body 16 is completed as an inlet 10a side end of the inlet-side nut 15a comes into contact with a projecting portion 16d of the inlet-side body 16. The amount of deformation of the tip portion 18a forced into the groove portion 16c can be kept appropriate by arranging the projecting portion 16d at an appropriate position.

The tip portion 19a of the outlet-side ferrule 19 is forced into the groove portion 17c of the outlet-side body 17 as the internal threads 15h of the outlet-side nut 15b become fastened to the external threads 17b of the outlet-side body 17. Because the groove portion 17c is sharper than the tip portion 19a, the tip portion 19a is gradually deformed as it is forced into the groove portion 17c, and finally, deformed to be accommodated in the groove portion 17c without leaving any space.

The deformation of the tip portion 19a forms a seal area between the outer circumferential surface of the measurement tube 11 and the inner circumferential surface of the outlet-side body 17, which reliably shuts off liquid that flows out through a location of connection of the connection flow passage 17a (the second connection flow passage) with the internal flow passage 10c so that the liquid never leaks to the outside. Moreover, the tip portion 19a of the outlet-side ferrule 19 is positioned in the vicinity of the location of connection of the connection flow passage 17a with the internal flow passage 10c, thereby reducing an amount of liquid that flows out through the connection location to be remained (dead volume).

The fastening of the internal threads 15h of the outlet-side nut 15b and the external threads 17b of the outlet-side body 17 is completed as an outlet 10b side end of the outlet-side nut 15b comes into contact with a projecting portion 17d of the outlet-side body 17. The amount of deformation of the tip portion 19a forced into the groove portion 17c can be kept appropriate by arranging the projecting portion 17d at an appropriate position.

As shown in FIG. 5A, a distance L1 from the inlet 11a of the measurement tube 11 to a position where the heating resistance wire 12a of the sensor substrate 12 is disposed in the direction of the axis X is longer than a distance L2 from the outlet 11b of the measurement tube 11 to the position where the heating resistance wire 12a of the sensor substrate 12 is disposed in the direction of the axis X. This is for the purpose of increasing the distance L1 from the location of connection of the connection flow passage 16a with the inlet 11a of the measurement tube 11 to the heating resistance wire 12a. Even if turbulence is generated in liquid flow at the connection flow passage 16a and the inlet 11a of the measurement tube 11, the liquid flow can be stabilized before it reaches the position where the heating resistance wire 12a of the sensor substrate 12 is disposed by increasing the distance L1.

Figure 12:
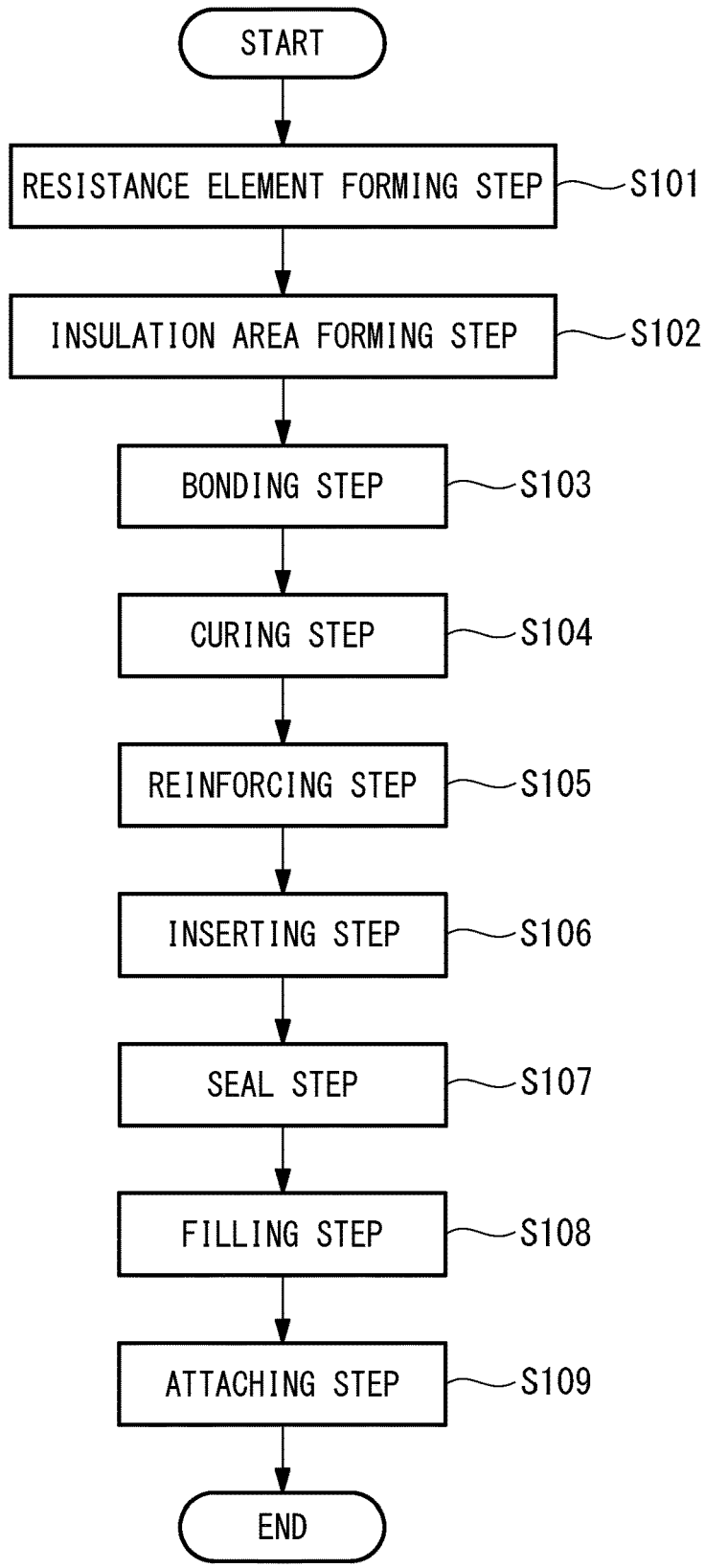
FIG. 12 is a flowchart showing a method of manufacturing the thermal flow meter.

Next, a method of manufacturing the thermal flow meter 100 of the present embodiment will be described. FIG. 12 is a flowchart showing the method of manufacturing the thermal flow meter 100.

In step S101, the metal film of platinum or the like is evaporated onto the detection surface 12A of the sensor substrate 12, to form the heating resistance wire 12a and the temperature detecting resistance wires 12b, 12c, 12d, 12e (a resistance element forming step).

In step S102, in the detection surface 12A, the heating resistance wire 12a and the temperature detecting resistance wires 12b, 12c, 12d, 12e are coated with the thin-film insulating material to form the insulation area 12B (an insulation area forming step).

In step S103, the adhesive is applied to either one or both of the insulation area 12B of the sensor substrate 12 and the flat surface 11c of the measurement tube 11, and the detection surface 12A and the flat surface 11c are brought into contact with each other via the adhesive, as shown in FIG. 5B (a bonding step; a joining step).

In step S104, the adhesive is solidified with the sensor substrate 12 and the measurement tube 11 mounted to a jig (not shown). For example, when an UV curable resin-based adhesive is used as the adhesive, the adhesive is irradiated with ultraviolet rays to cure the adhesive (a curing step). The adhesive is cured, to fix the sensor substrate 12 to the measurement tube 11.

In step S105, the inlet 11a side end portion of the sensor substrate 12 and the inlet 11a side end portion of the flat surface 11c are joined with the adhesive 81, and the outlet 11b side end portion of the sensor substrate 12 and the outlet 11b side end portion of the flat surface 11c are joined with the adhesive 82 (a reinforcing step). This step reinforces the inlet 11a side end portion of the flat surface 11c of the measurement tube 11, and the outlet 11b side end portion of the flat surface 11c of the measurement tube 11.

In step S106, the inlet 11a of the measurement tube 11 is inserted into the inlet-side nut 15a, the inlet-side ferrule 18, and the inlet-side body 16 in this order. Also, the outlet 11b of the measurement tube 11 is inserted into the outlet-side nut 15b, the outlet-side ferrule 19, and the outlet-side body 17 in this order (an inserting step).

In step S107, the internal threads 15g of the inlet-side nut 15a are fitted around the external threads 16b of the inlet-side body 16, and fastened until the inlet 10a side end portion of the inlet-side nut 15a comes into contact with the projecting portion 16d. Also, the internal threads 15h of the outlet-side nut 15b are fitted around the external threads 17b of the outlet-side body 17, and fastened until the outlet 10b side end portion of the outlet-side nut 15b comes into contact with the projecting portion 17d. Here, the tip portion 18a of the inlet-side ferrule 18 and the tip portion 19a of the outlet-side ferrule 19 are each deformed to form the seal areas (a seal step).

In step S108, the recess 15e provided in the outlet 10b side end portion of the inlet-side nut 15a is filled with the filler 15i, to cure the filler 15i. Similarly, the recess 15f provided in the inlet 10a side end portion of the outlet-side nut 15b is filled with the filler 15j, to cure the filler 15j (a filling step). The sensor unit 10 shown in FIG. 3 is manufactured in this way.

In step S109, the sensor unit 10 is inserted into the bottom case 50, and the stopper 70 is inserted in between the bottom case 50 and the sensor unit 10. Thus, the sensor unit 10 is fixed to the bottom case 50. The control substrate 20 and the relay substrate 30 are attached to the upper case 40. The upper case 40 is attached to the bottom case 50 (an attaching step). Also, the wiring patterns 12f to 12m of the sensor substrate 12, and a wiring pattern (not shown) of the control substrate 20 are electrically connected via the flexible substrate 60. The thermal flow meter 100 of the present embodiment is manufactured by the foregoing steps.

A description will be given of the operation and effect of the thermal flow meter 100 of the present embodiment described above.

According to the thermal flow meter 100 of the present embodiment, because the measurement tube 11 including the internal flow passage 10c through which the liquid flows is the conductive tube element made of the metal or the like and having the corrosion resistance to alkaline liquids, the corrosion resistance to alkaline liquids can improve. Furthermore, in the detection surface 12A of the sensor substrate 12, the insulation area 12B is formed where the heating resistance wire 12a and the temperature detecting resistance wires 12b, 12c, 12d, 12e are coated with the insulating material, and the insulation area 12B is bonded with the adhesive to the measurement tube 11. For that reason, the conductive measurement tube 11 and the heating resistance wire 12a and the temperature detecting resistance wires 12b, 12c, 12d, 12e formed on the detection surface 12A are electrically blocked by the thin-film insulating material. Therefore, the flow rate of the liquid flowing through the internal flow passage 10c can be measured by using the sensor substrate 12 including the resistance elements formed on the detection surface 12A.

Also, according to the thermal flow meter 100 of the present embodiment, the flat surface 11c formed on the outer circumferential surface of the measurement tube 11 is bonded with the adhesive 80 to the insulation area 12B on the flatly formed detection surface 12A. The flat surfaces are bonded to each other with the adhesive 80, and this can provide a broad contact area to enhance adhesiveness while reducing an amount of the adhesive required for the bonding.

According to the thermal flow meter 100 of the present embodiment, the wiring patterns 12f, 12g, 12h, 12i, 12j, 12k, 12l, 12m to electrically connect the heating resistance wire 12a and the temperature detecting resistance wires 12b, 12c, 12d, 12e to the flexible substrate 60 are exposed from the insulation area 12B. For that reason, the flexible substrate 60 can be easily joined, after the insulation area 12B is formed in the detection surface 12A.

Also, according to the thermal flow meter 100 of the present embodiment, the distance D1 from the detection surface 12A of the sensor substrate 12 to the inner circumferential surface 10d of the internal flow passage 10c is shorter than the distance D2 from the top 11d of the measurement tube 11 to the inner circumferential surface 10d. This can improve a property of the heating resistance wire 12a to heat the liquid inside the internal flow passage 10c and properties of the temperature detecting resistance wires 12b, 12c, 12d, 12e to detect the temperature of the liquid, as compared with a case where these distances are equal.

Furthermore, according to the thermal flow meter 100 of the present embodiment, the sensor substrate 12 is used that is made of glass having less probability of deformation by heating, and this can suppress the deflection caused when the sensor substrate 12 is bonded to the measurement tube 11 or during use.

Additionally, according to the thermal flow meter 100 of the present embodiment, the measurement tube 11 is formed of glassy carbon, and glassy carbon is a material having corrosion resistance to alkaline liquids, so that the corrosion resistance to the alkaline liquids can improve. Also, glassy carbon has a thermal conductivity lower than a thermal conductivity of the metal material, and has less amount of heat to be transferred in the direction of the axis X of the measurement tube 11, and hence power required for heating the liquid flowing through the internal flow passage 10c can be reduced.

Also, according to the thermal flow meter 100 of the present embodiment, the heating period of the voltage signal output from the control substrate 20 to the heating resistance wire 12a is set to the period that is shorter than the non-heating period, so that the non-heating period between two adjacent heating periods can be sufficiently acquired, and a difference between temperatures of liquid that are detected by the temperature detecting resistance wire 12b can be sufficiently acquired.

According to the thermal flow meter 100 of the embodiment, the inlet 11a of the measurement tube 11 is inserted into the inlet-side body 16 and connected to the connection flow passage 16a formed inside the inlet-side body 16. Similarly, the outlet 11b of the measurement tube 11 is inserted into outlet-side body 17 and connected to the connection flow passage 17a formed inside the outlet-side body 17.

When the external threads 16b formed on the outer circumferential surface of the inlet-side body 16 are fastened to the internal threads 15g formed on the inner circumferential surface of the inlet-side nut 15a, the cylindrical inlet-side ferrule 18 that is fitted around the outer circumferential surface of the measurement tube 11 is deformed to form the seal area. Similarly, when the external threads 17b formed on the outer circumferential surface of the outlet-side body 17 are fastened to the internal threads 15h formed on the inner circumferential surface of the outlet-side nut 15b, the cylindrical outlet-side ferrule 19 that is fitted around the outer circumferential surface of the measurement tube 11 is deformed to form the seal area.

The formation of the seal area on the inlet side of the measurement tube 11 prevents the liquid from flowing out through the location of connection of the internal flow passage 10c of the measurement tube 11 with the connection flow passage 16a of the inlet-side body 16. Similarly, the formation of the seal area on the outlet side of the measurement tube 11 prevents the liquid from flowing out through the location of connection of the internal flow passage 10c of the measurement tube 11 with the connection flow passage 17a of the outlet-side body 17.

According to the thermal flow meter 100 of the embodiment, the end portion of the sensor substrate 12 facing the inlet 11a are fixed, by the filler 15i, inside the recess 15e of the inlet-side nut 15a, and the end portion of the sensor substrate 12 facing the outlet 11b are fixed, by the filler 15j, inside the recess 15f of the outlet-side nut 15b. This can securely fix the sensor substrate 12 to the measurement tube 11 while fixing the measurement tube 11 to each of the inlet-side nut 15a and the outlet-side nut 15b.

Next, a thermal flow meter 100 according to a second embodiment of the present disclosure will be described with reference to the drawings.

The second embodiment is a modification of the first embodiment, and is similar to the first embodiment unless otherwise described hereinafter.

In the measurement tube 11 of the sensor unit 10 according to the first embodiment, the upper side of the cross section defined by the plane orthogonal to the axis X is almost circular, at the position to which the sensor substrate 12 is bonded, and the surface disposed as opposed to the detection surface 12A of the sensor substrate 12 is the flat surface 11c that is flat. On the other hand, a measurement tube 11A of a sensor unit 10A according to the present embodiment has an almost elliptic shape with a major axis extending along a detection surface 12A, at a position to which a sensor substrate 12 is bonded.

Figure 13A:
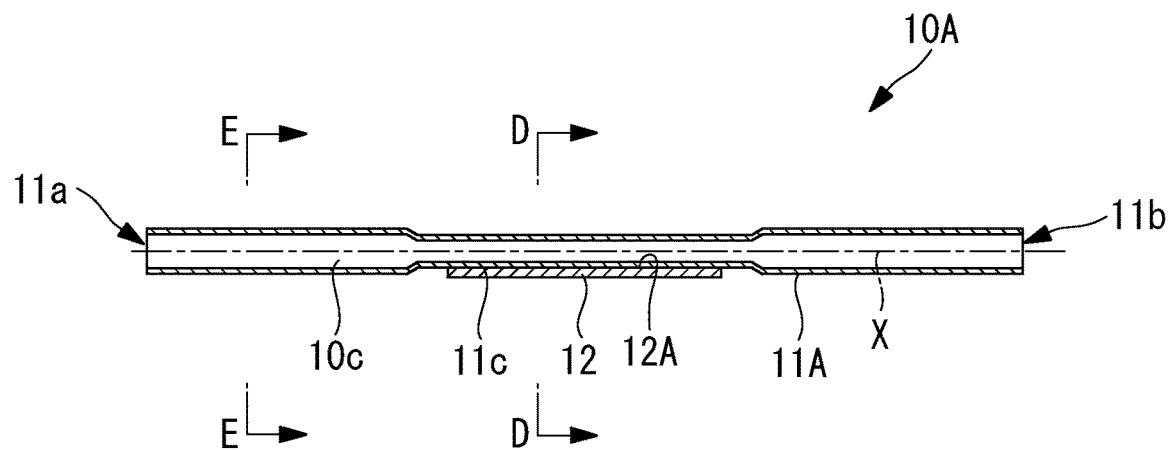
FIG. 13A is a vertical cross-sectional view of a measurement tube and a sensor substrate according to a second embodiment.
Figure 13B:
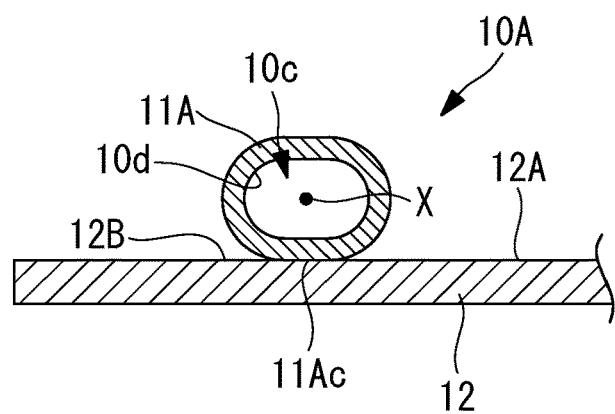
FIG. 13B is an end view of the measurement tube and the sensor substrate taken along the line D-D shown in FIG. 13A.

As shown in FIG. 13A, the measurement tube 11A of the present embodiment is formed in a shape such that an inner diameter and an outer diameter in a direction orthogonal to the detection surface 12A are large on sides of an inlet 11a and an outlet 11b, and are small in a middle portion between the inlet 11a and the outlet 11b. As shown in FIG. 13B, a cross section of the measurement tube 11A that is orthogonal to an axis X has the almost elliptic shape with the major axis extending along the detection surface 12A.

The measurement tube 11A of the present embodiment includes a flat surface 11Ac flatly extending along the detection surface 12A, in a portion in contact with an insulation area 12B of the detection surface 12A. The insulation area 12B is bonded with an adhesive (not shown) to the flat surface 11Ac.

Figure 13C:
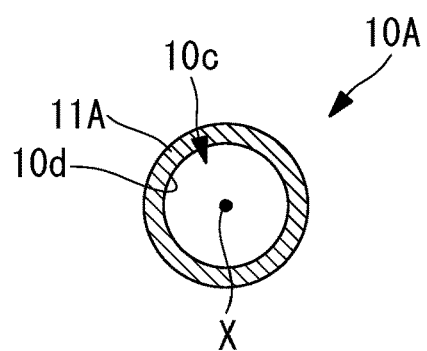
FIG. 13C is an end view of the measurement tube and the sensor substrate taken along the line E-E shown in FIG. 13A.

As shown in FIG. 13C, the measurement tube 11A of the present embodiment has a cylindrical shape extending around the axis X, in a portion that is not in contact with the insulation area 12B of the detection surface 12A. The measurement tube 11A is made of a metal having corrosion resistance to alkaline liquids (e.g., a stainless steel material such as SUS304 or 316, or nickel alloy such as Hastelloy®. For example, the cylindrical shape extending around the axis X is partially deformed, to form an almost elliptic portion including the flat surface 11Ac.

According to the present embodiment, comparatively simple processing of partially deforming a cylindrical pipe made of a metal is performed, so that there can be provided the measurement tube 11A that can measure a flow rate by use of the sensor substrate 12 including resistance elements formed on the detection surface 12A while improving the corrosion resistance to alkaline liquids and acquiring insulation with the insulation area 12B, and also a thermal flow meter including the measurement tube.

Note that the measurement tube 11 may be a conductive tube element having the corrosion resistance to alkaline liquids and conductivity. As this tube element, for example, a tube element made of, for example, glassy carbon may be used. When the glassy carbon is used, the measurement tube 11 is processed and manufactured in such a shape as shown in FIG. 13A, FIG. 13B, and FIG. 13C.

Next, a thermal flow meter 100 according to a third embodiment of the present disclosure will be described with reference to the drawings.

The third embodiment is a modification of the first embodiment, and is similar to the first embodiment unless otherwise described hereinafter.

In the measurement tube 11 of the sensor unit 10 according to the first embodiment, the upper side of the cross section defined by the plane orthogonal to the axis X is almost circular, at the position to which the sensor substrate 12 is bonded, and the surface disposed as opposed to the detection surface 12A of the sensor substrate 12 is the flat surface 11c that is flat. On the other hand, a measurement tube 11B of a sensor unit 10B according to the present embodiment has a cylindrical shape extending around an axis X, at a position to which a sensor substrate 12 is bonded.

Figure 14A:
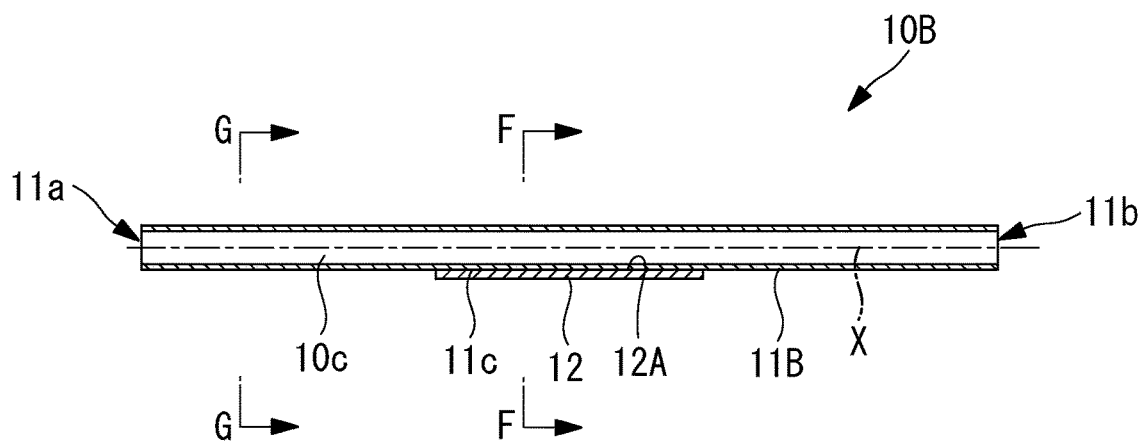
FIG. 14A is a vertical cross-sectional view of a measurement tube and a sensor substrate according to a third embodiment.
Figure 14B:
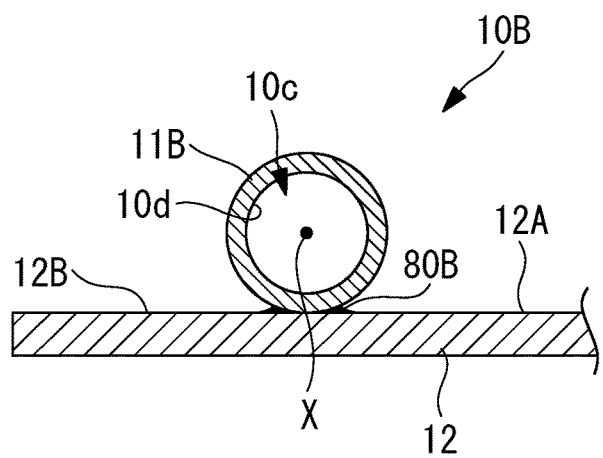
FIG. 14B is an end view of the measurement tube and the sensor substrate taken along the line F-F shown in FIG. 14A.
Figure 14C:
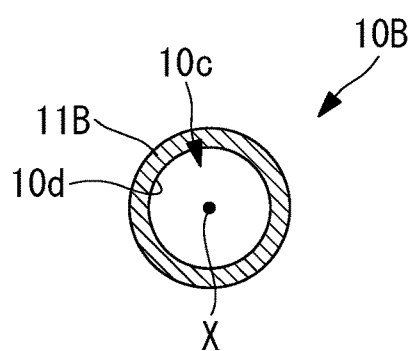
FIG. 14C is an end view of the measurement tube and the sensor substrate taken along the line G-G shown in FIG. 14A.

As shown in FIG. 14A, the measurement tube 11B of the present embodiment is formed such that an inner diameter and an outer diameter in a direction orthogonal to a detection surface 12A are the same on sides of an inlet 11a and an outlet 11b, and in a middle portion between the inlet 11a and the outlet 11b. As shown in FIG. 14B, a cross section of the measurement tube 11A that is orthogonal to the axis X has a cylindrical shape extending around the axis X. An insulation area 12B is bonded with an adhesive 80B to an outer circumferential surface of the measurement tube 11B. As shown in FIG. 14C, the measurement tube 11B of the present embodiment has a cylindrical shape extending around the axis X, also in a portion that is not in contact with the insulation area 12B of the detection surface 12A.

According to the present embodiment, a cylindrical pipe made of a metal is not processed but is used as it is, so that there can be provided the measurement tube 11B that can measure a flow rate by use of the sensor substrate 12 including resistance elements formed on the detection surface 12A while improving corrosion resistance to alkaline liquids and acquiring insulation with the insulation area 12B, and also a thermal flow meter including the measurement tube.

While example embodiments have been particularly shown and described, it will be understood by those skilled in the art that various changes in form and details may be made therein without departing from the scope of the embodiments encompassed by the appended claims.

What is claimed is:

1. A flow meter comprising:
    a conductive measurement tube including an inlet through which liquid enters and an outlet through which the liquid flowing from the inlet exits and including an internal flow passage extending along an axis, and
    a temperature detecting substrate including a heating resistance element and a temperature detecting resistance element formed on a detection surface along the axis, wherein in the detection surface, an insulation area is formed where the heating resistance element and the temperature detecting resistance element are coated with a thin-film insulating material,
    the insulation area is joined to the measurement tube along the axis,
    the detection surface is a flatly formed surface,
    an outer circumferential surface of the measurement tube includes a flat surface disposed as opposed to the detection surface of the temperature detecting substrate, and
    the flat surface is bonded with an adhesive to the insulation area.

2. The flow meter according to claim 1, wherein in the detection surface, a wiring pattern is formed to electrically connect the heating resistance element and the temperature detecting resistance element to an external connection terminal, and
    the insulation area is formed to expose a part of the wiring pattern.

3. The flow meter according to claim 1, wherein a first distance from the detection surface of the temperature detecting substrate to an inner circumferential surface of the internal flow passage is shorter than a second distance from a top of the measurement tube to the inner circumferential surface of the internal flow passage.

4. The flow meter according to claim 1, wherein the temperature detecting substrate is made of glass.

5. A flow meter, comprising:
    a conductive measurement tube including an inlet through which liquid enters and an outlet through which the liquid flowing from the inlet exits and including an internal flow passage extending along an axis, and
    a temperature detecting substrate including a heating resistance element and a temperature detecting resistance element formed on a detection surface along the axis, wherein
    in the detection surface, an insulation area is formed where the heating resistance element and the temperature detecting resistance element are coated with a thin-film insulating material,
    the insulation area is joined to the measurement tube along the axis, and
    the measurement tube is formed of glassy carbon.

6. The flow meter according to claim 1, further comprising:
    a control substrate that outputs, to the temperature detecting substrate, a voltage signal to heat the heating resistance element, wherein the control substrate outputs the voltage signal to the heating resistance element to periodically repeat a heating period to heat the heating resistance element and a non-heating period not to heat the heating resistance element, and the heating period is set to a period that is shorter than the non-heating period.

7. A method of manufacturing a flow meter comprising a conductive measurement tube including an inlet through which liquid enters and an outlet through which the liquid flowing from the inlet exits and including an internal flow passage extending along an axis, and a temperature detecting substrate including a heating resistance element and a temperature detecting resistance element formed on a detection surface along the axis, the manufacturing method comprising:
    a resistance element forming step of forming the heating resistance element and the temperature detecting resistance element on the detection surface of the temperature detecting substrate,
    an insulation area forming step of coating the heating resistance element and the temperature detecting resistance element with a thin-film insulating material to form an insulation area in the detection surface, and
    a joining step of joining the insulation area to the measurement tube along the axis, wherein
    the detection surface is a flatly formed surface,
    an outer circumferential surface of the measurement tube includes a flat surface disposed as opposed to the detection surface of the temperature detecting substrate, and
    the flat surface is bonded with an adhesive to the insulation area.

* * * * *